(12) United States Patent
Le

(10) Patent No.: US 7,058,640 B2
(45) Date of Patent: Jun. 6, 2006

(54) SYSTEMS, METHODS, AND COMPUTER PROGRAM PRODUCTS TO EFFICIENTLY UPDATE MULTIDIMENSIONAL DATABASES

(75) Inventor: Jian Le, San Mateo, CA (US)

(73) Assignee: International Business Machines Corporation, Armonk, NY (US)

(\*) Notice: Subject to any disclaimer, the term of this patent is extended or adjusted under 35 U.S.C. 154(b) by 482 days.

(21) Appl. No.: 10/361,114

(22) Filed: Feb. 5, 2003

(65) Prior Publication Data

US 2005/0076036 A1    Apr. 7, 2005

(51) Int. Cl.
G06F 7/00       (2006.01)
G06F 17/00      (2006.01)

(52) U.S. Cl. ..................... 707/100; 707/101
(58) Field of Classification Search ............. 707/2, 707/203, 3, 10, 101, 100; 705/36 R; 711/118; 709/223
See application file for complete search history.

(56) References Cited

U.S. PATENT DOCUMENTS

| | | | |
|---|---|---|---|
| 5,159,647 A | 10/1992 | Burt | 382/37 |
| 5,295,261 A | 3/1994 | Simonetti | 395/600 |
| 5,546,571 A | 8/1996 | Shan et al. | 395/600 |
| 5,592,667 A | 1/1997 | Bugajski | 395/613 |
| 5,701,467 A | 12/1997 | Freeston | 395/611 |
| 5,832,475 A | 11/1998 | Agrawal | 707/2 |
| 5,848,408 A * | 12/1998 | Jakobsson et al. | 707/3 |
| 5,926,820 A | 7/1999 | Agrawal et al. | 707/200 |
| 5,978,788 A | 11/1999 | Castelli et al. | 707/2 |
| 6,003,029 A | 12/1999 | Agrawal et al. | 707/7 |
| 6,141,655 A | 10/2000 | Johnson et al. | 707/2 |
| 6,154,736 A | 11/2000 | Chickering et al. | 706/59 |
| 6,249,788 B1 | 6/2001 | Ronstrom | 707/101 |
| 6,356,913 B1 | 3/2002 | Chu et al. | 707/103 R |
| 6,359,637 B1 | 3/2002 | Perkins et al. | 345/853 |
| 6,381,605 B1 | 4/2002 | Kothuri et al. | 707/100 |
| 6,424,967 B1 | 7/2002 | Johnson et al. | 707/3 |
| 6,484,159 B1 * | 11/2002 | Mumick et al. | 707/2 |
| 6,847,983 B1 * | 1/2005 | Somalwar et al. | 707/203 |
| 6,882,993 B1 * | 4/2005 | Lawande et al. | 707/2 |
| 2002/0099691 A1 * | 7/2002 | Lore et al. | 707/2 |

OTHER PUBLICATIONS

"Maintenance of Data Cubes and Summary Tables in a Warehouse", Quass et al. International Conference on Management of Data Archive Proceedings of the 1997 ACM SIGMOD International Conference on Management of Data, pp. 100-111; 1997; ACM Press.*

Palpanas et at., "Incremental Mainenance for Non-Distributive Aggregate Functions", Proceedings of the 28th VLDB Conference, Hong Kong China, 2002.*

\* cited by examiner

*Primary Examiner*—Jeffrey Gaffin
*Assistant Examiner*—Michael J. Hicks
(74) *Attorney, Agent, or Firm*—Christine H. Smith; Janet M. Skafer

(57) ABSTRACT

Systems, methods, and computer products that efficiently update multidimensional data cubes by using hierarchy dependency relationships that are present in the tables of the multidimensional database. An embodiment of the present invention improves the techniques associated with refreshing multidimensional database information when the multidimensional data has been changed.

6 Claims, 8 Drawing Sheets

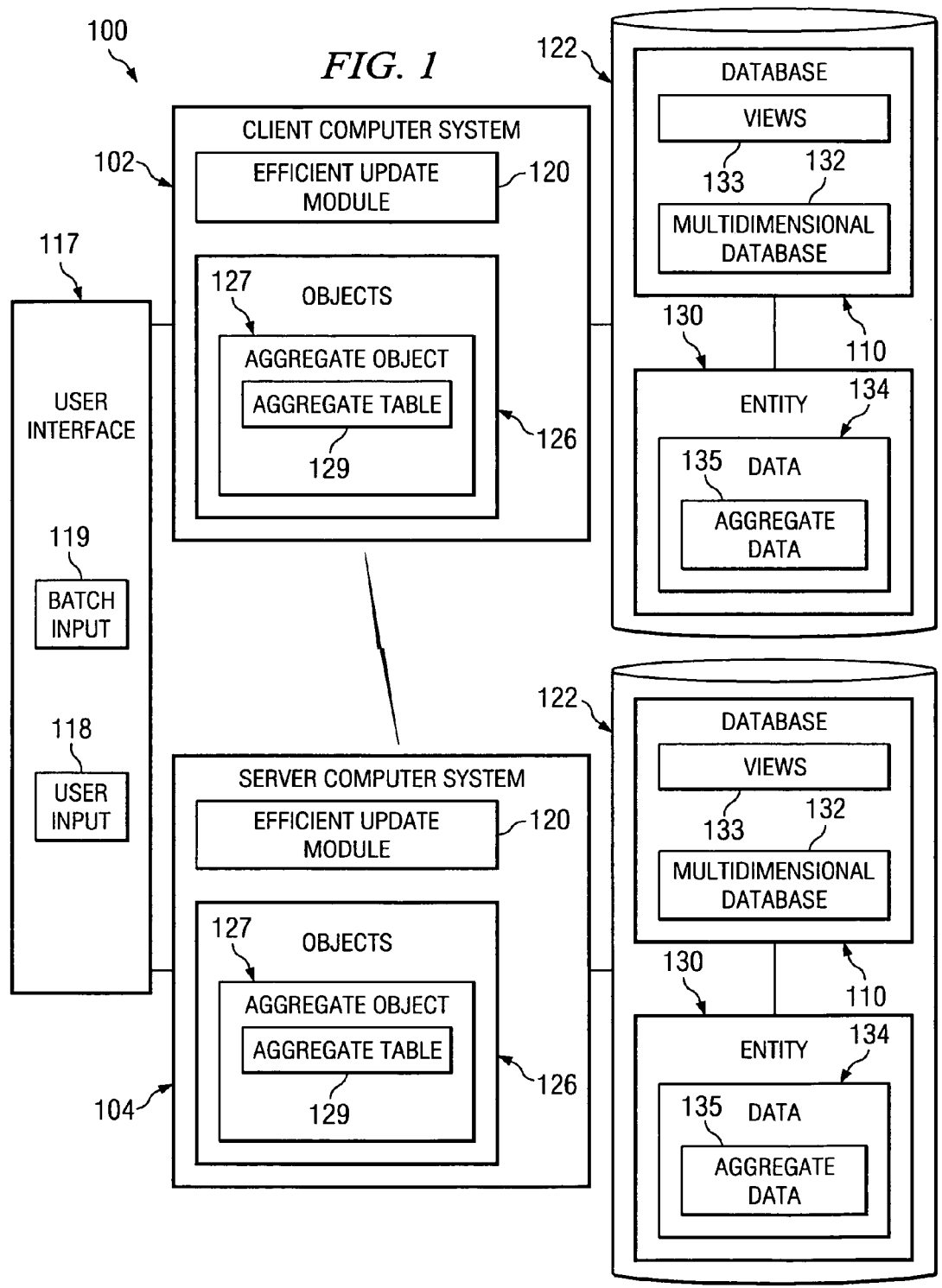

FIG. 3
| FIG. 3A |
| FIG. 3B |
| FIG. 3C |
| FIG. 3D |
| FIG. 3E |
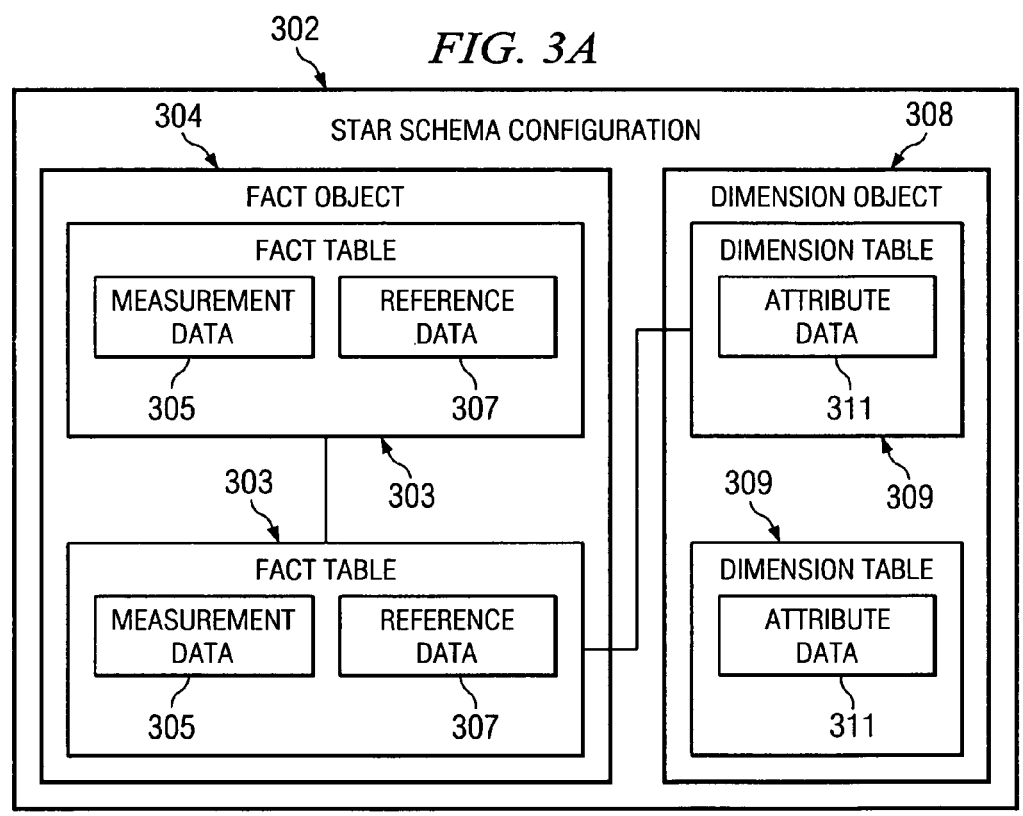
FIG. 3A
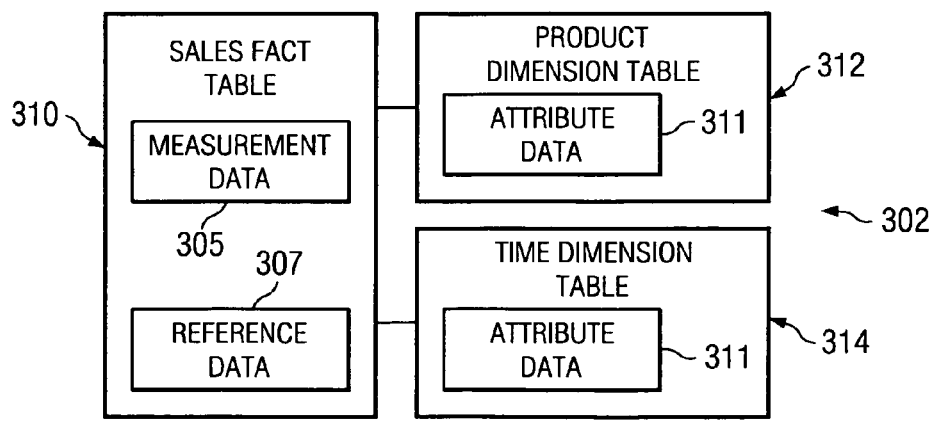
FIG. 3B

*FIG. 3C*

| PRODUCT DIMENSION TABLE 312 |||||
|---|---|---|---|---|
| PRODUCT CODE 350 | BRAND CODE 352 | COMPANY CODE 354 | ROOT CODE 356 | STATUS 358 |
| 1 | 9 | 13 | 15 | 0 |
| 2 | 9 | 13 | 15 | 0 |
| 3 | 10 | 13 | 15 | 0 |
| 4 | 10 | 13 | 15 | 0 |
| 5 | 11 | 14 | 15 | 0 |
| 6 | 11 | 14 | 15 | 0 |
| 7 | 12 | 14 | 15 | 0 |
| 8 | 12 | 14 | 15 | 0 |

366 ↗ (row 5), 369 ↗ (row 8)

| BRAND CODE AGGREGATE TABLE 380 ||||
|---|---|---|---|
| BRAND CODE 352 | SUM-SALES 381 | SUM-COST 383 | COVARIANCE (SALES, COST) 385 |
| 9 | 14.25 | 9.0 | 3.25 |
| 10 | 11.75 | 9.0 | 0.00 |
| 11 | 2.50 | 1.0 | 0.00 |
| 12 | 1.00 | 0.5 | 0.00 |

382

| SALES FACT TABLE 310 ||||
|---|---|---|---|
| PRODUCT CODE 350 | DATE 360 | SALES ITEM 362 | COST ITEM 364 |
| 1 | 2001-1-12 | 3.00 | 2.00 |
| 4 | 2001-1-12 | 4.00 | 3.00 |
| 1 | 2001-1-14 | 3.25 | 2.00 |
| 3 | 2001-1-14 | 4.00 | 3.00 |
| 2 | 2001-1-16 | 8.00 | 5.00 |
| 4 | 2001-1-16 | 3.75 | 3.00 |
| 7 | 2001-1-18 | 1.00 | 0.50 |
| 5 | 2001-1-18 | 2.50 | 1.00 |

| PRODUCT DIMENSION TABLE 312 | | | | |
|---|---|---|---|---|
| PRODUCT CODE 350 | BRAND CODE 352 | COMPANY CODE 354 | ROOT CODE 356 | STATUS 358 |
| 1 | 9 | 13 | 15 | 0 |
| 2 | 9 | 13 | 15 | 0 |
| 3 | 10 | 13 | 15 | 0 |
| 4 | 10 | 13 | 15 | 0 |
| 5 | 11 | 14 | 15 | 0 |
| 6 | 11 | 14 | 15 | 0 |
| 7 | 12 | 14 | 15 | 0 |
| 8 | 12 | 14 | 15 | 1 |

370, 371

| DELTA SALES FACT TABLE 368 | | | |
|---|---|---|---|
| PRODUCT CODE 350 | DATE 360 | SALES ITEM 362 | COST ITEM 364 |
| 8 | 2001-2-01 | 9.00 | 7.50 |

372

| SALES FACT TABLE 310 | | | |
|---|---|---|---|
| PRODUCT CODE 350 | DATE 360 | SALES ITEM 362 | COST ITEM 364 |
| 1 | 2001-1-12 | 3.00 | 2.00 |
| 4 | 2001-1-12 | 4.00 | 3.00 |
| 1 | 2001-1-14 | 3.25 | 2.00 |
| 3 | 2001-1-14 | 4.00 | 3.00 |
| 2 | 2001-1-16 | 8.00 | 5.00 |
| 4 | 2001-1-16 | 3.75 | 3.00 |
| 7 | 2001-1-18 | 1.00 | 0.50 |
| 5 | 2001-1-18 | 2.50 | 1.00 |
| 8 | 2001-2-01 | 9.00 | 7.50 |

| RECOMPUTED BRAND CODE AGGREGATE TABLE 384 | | | |
|---|---|---|---|
| BRAND CODE | SUM-SALES | SUM-COST | COVARIANCE (SALES, COST) |
| 9 | 14.25 | 9.0 | 3.25 |
| 10 | 11.75 | 9.0 | 0.00 |
| 11 | 2.50 | 1.0 | 0.00 |
| 12 | 10.00 | 8.0 | 14.00 |

386

SYSTEMS, METHODS, AND COMPUTER PROGRAM PRODUCTS TO EFFICIENTLY UPDATE MULTIDIMENSIONAL DATABASES

BACKGROUND OF THE INVENTION

1. Field of the Invention

The present invention is directed to the field of computer-implemented multidimensional database information management. It is more particularly directed at efficiently updating multidimensional database information.

2. Description of the Background Art

A computer-implemented database is a collection of data, organized in the form of tables. A table typically consists of columns that represent data of the same nature, and records that represent specific instances of data associated with the table. A relational database is a database that may be a set of tables containing information that is manipulated in accordance with the relational model associated with the data. For example, the product marketed under the trademarks IBM DB2 stores the data associated with the database in tables, and each table has a name. It will be appreciated that other vendors provide relational databases.

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise, such as a corporation, through rapid access to a wide variety of data dimensions that are organized to reflect the multidimensional nature of enterprise data, typically by means of hypotheses about possible trends in the data. More particularly, OLAP techniques may be used to analyze data from different viewpoints by identifying interesting associations in the information in a database. Therefore, OLAP is a decision support technique used in data management for the purpose of modeling, analyzing, and reporting information, such as business information.

An increasingly popular data model for OLAP applications is the multidimensional database (MDDB). Often, data analysts use MDDBs during interactive exploration of data for finding regions of anomalies in the data. Before this data can be explored, data modeling needs to be enabled. Modeling data for an OLAP application may require large amounts of metadata, including data entities that may manage the associations between the data. The terms "data cube," "multidimensional database," "multidimensional cube," and "cube" will be used interchangeably herein.

Hierarchy dependency relationships are present in dimension tables of the multidimensional database and are used to identify interesting associations in the information in the database. Often the hierarchy dependency relationships are used to manage the aggregate operations of multidimensional data. As incremental changes are made to the multidimensional data at a base transactional level, the associated aggregated data must be updated to ensure that the multidimensional information at various levels is accurate. For example, when multidimensional data at the base level is changed via a data transaction, the aggregated data at higher levels must also be refreshed or changed to ensure consistency of the multidimensional database information. This refresh typically involves accessing the metadata that manages the hierarchy dependency relationships between the multidimensional data and recomputing multidimensional aggregate values at various levels. Since each multidimensional database may have hundreds of aggregate tables and each aggregate table may have millions of rows, accessing metadata and refreshing aggregate data is often time consuming and adds increased cost to the techniques associated with analyzing multidimensional database information.

It would be useful for data analysts to be able to change multidimensional database data without incurring the high cost associated with a refresh of the associated data. From the foregoing it will be apparent that there is still a need to improve the techniques associated with refreshing multidimensional database information when some of the multidimensional data has been changed.

SUMMARY OF THE INVENTION

An embodiment of the present invention relates to systems, methods, and computer products that incrementally update multidimensional data cubes by using hierarchy dependency relationships that are present in the tables of the multidimensional database. It has been difficult for data analysts to change multidimensional database data without incurring the high cost associated with a refresh of the associated data. An embodiment of the present invention improves the techniques associated with refreshing associated multidimensional database information when some of the multidimensional data has been changed.

A data warehouse is a logical design of the relationship of data entities modeled in a database. More particularly, a data warehouse is a subject-oriented collection of data used to facilitate strategic decision-making. The hierarchical relationships of data may be defined within a data warehouse. In the data warehouse, a star schema configuration may be used to represent the logical design of relationships among the data entities. According to the preferred embodiment of the present invention a change to data at a lower level of the hierarchical representation will logically impact a subset of the data in the multidimensional database at higher levels of the hierarchical representation. According to the preferred embodiment of the present invention, the affected data regions, such as objects, may be identified and used to limit the scope of data refresh to only that data at higher levels that has been affected by the change.

The preferred embodiment of the present invention may rely on a typical star schema layout of data entities that includes a fact object, typically containing a single fact table, and multiple dimension objects represented by dimension tables. More particularly, a physical representation of a star schema in a relational database is a set of relational tables including the fact table, which is the main table, and related dimension tables wherein the dimension tables intersect the fact table via predefined referential relations. Further, the star schema comprises fact tables, which are joined to one or more dimension tables according to specified relational or conditional operations. The fact tables hold reference data related to attribute data and measurement data, and the dimension tables hold attribute data. The dimension tables are usually joined to the fact tables with an equivalence condition. Because a star schema is simple, having few tables, it minimizes the complexity required to process database operations. This helps both to increase performance speed and to ensure correct results of database operations. Therefore, many multidimensional relational databases have been built in the star schema configuration to minimize database management overhead.

The preferred embodiment of the present invention novelly uses the information that is stored in the star schema configuration and that represents a hierarchical view of the data. More particularly and in the preferred embodiment of the present invention, an aggregate table is defined that includes an aggregation of a defined subset of data from at least one fact table and the associated dimension tables. By identifying and using the subset of the hierarchically represented data, refresh operations may be limited to only the subset of data related to the changed data.

By means of further explanation, the preferred embodiment of the present invention forms subset dimension tables related to accumulated incremental changes of the multidimensional data. These subset dimension tables are used to form subset cubes to refresh multidimensional data. Since subsets of dimension tables usually have fewer entries than the original dimension tables, subset cubes formed by the subset dimension tables typically have fewer table entries than the original cube. Therefore, the refresh of the subset cube may be implemented with fewer resources than a refresh of the original cube.

The hierarchical view of multidimensional data may be partitioned into multiple levels of the data. The bottom-most transaction level typically represents the multidimensional data. The higher levels typically represent associated and often aggregated data. Typically at the transaction level, new data is added or existing data is changed. In order to answer questions about the data, such as ones that may be associated with OLAP analysis, the aggregate tables are typically accessed. The preferred embodiment of the present invention takes advantage of the fact that incremental changes at the transaction level typically affect only a small portion of the information at the higher levels, and therefore data refresh is applied to only the affected associated aggregate values at the higher levels. For example, product data at the transaction level may be associated with aggregated data, such as monthly summary product data. When transaction level product data is changed, the preferred embodiment of the present invention refreshes only a subset of the associated monthly summary data. The terms "transaction level" and "leaf level" will be used interchangeably herein.

The preferred embodiment of the present invention uses a status column in each dimension table of the star schema configuration to indicate the affected data, at the leaf level, that was changed typically by data transactions. The affected data is typically stored in objects that represent data entities. The identified affected data at the leaf level is then, in turn, used to determine the affected data objects at the higher hierarchy levels.

The preferred embodiment of the present invention uses relational database views to manage the affected data and the associated objects at each level, including the leaf level, of each dimensional hierarchy. The use of the term "database views" will be appreciated by those skilled in the art.

Changes to multidimensional data may occur in the data warehouse system at both the leaf level and at other higher levels. Occasionally, a data analyst issues questions or queries that change data at a higher level. Therefore and by means of example, if a product brand (that represents aggregated information about individual products) is sold to another company, the preferred embodiment of the present invention identifies the affected data at the higher levels, such as the company and root levels, and makes the necessary refresh changes to the affected aggregate tables.

An embodiment of the present invention is achieved by systems, methods, and computer products that improve incremental updates of multidimensional data. An embodiment of the method comprises: (i) identifying and accumulating changes made to at least one fact table that is to be updated; (ii) setting an indicator value in the status column in at least one dimension table for the changed data; (iii) identifying the affected data and associated objects at the leaf level by using the indicator values in the status column in at least one dimension table; (iv) identifying the affected data and associated objects at higher levels by using embedded hierarchy dependency relationships in at least one dimension table; (v) determining the leaf-level data elements, in at least one dimension table, that are associated with the affected objects; (vi) using the associated leaf-level data to form a subset of the original data in at least one dimension table; and (vii) updating at least one multidimensional database aggregate table with the subset of the data in the original dimension table and the updated fact table.

An alternative embodiment of the present invention identifies the affected data at each level of each dimensional hierarchy, including the leaf level, only once and does not require multiple accesses to the changed data in order to determine the associated data for refresh operations. The identified data is typically stored in objects that represent data entities.

An embodiment of the present invention novelly improves the techniques that are associated with refreshing multidimensional database information when the multidimensional data has been incrementally changed by efficiently updating a subset of the multidimensional data cubes. Such an incremental refresh technique uses hierarchy dependency relationships that are present in the tables of the multidimensional database. Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a block diagram that illustrates the computer systems that may implement the present invention;

FIG. 2 includes FIG. 2A, FIG. 2B, FIG. 2C, and FIG. 2D;

FIG. 3 includes FIG. 3A, FIG. 3B, FIG. 3C, FIG. 3D, and FIG. 3E;

FIG. 3A is a block diagram that illustrates a fact object and a dimension object;

FIG. 3B is a block diagram that illustrates an example of a fact table and dimension tables;

FIG. 3C is a block diagram that illustrates an example of the data included in a fact table, a dimension table, and an aggregate table;

FIG. 3D is a block diagram that illustrates an example an updated fact table, an updated dimension table, and a delta fact table;

FIG. 3E is a block diagram that illustrates an example of the data in an aggregate table after a data change and refresh;

In the following detailed description and in the several figures of the drawings, like elements are identified with like reference numerals.

DETAILED DESCRIPTION OF THE INVENTION

Figure 2A:
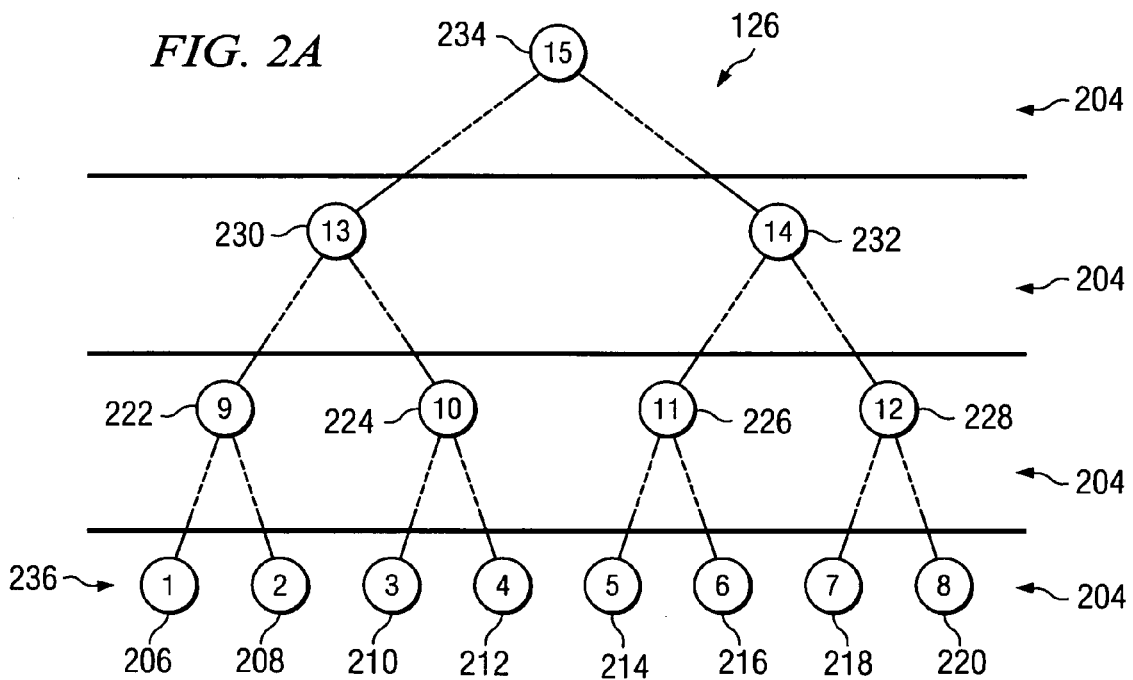
FIG. 2A is a block diagram that illustrates the hierarchy dependency relationship.

As shown in the drawings and for purposes of illustration, an embodiment of the invention efficiently updates multidimensional databases by using hierarchy dependency relationships that are present in the tables of the multidimensional database. Levels may be used to represent the hierarchy dependency relationships. It has been difficult for data analysts to change multidimensional database data (multidimensional data) without incurring the high cost associated with a refresh of the associated data. An embodiment of the present invention improves the techniques associated with refreshing multidimensional data at higher levels when the multidimensional data at a lower level, such as the leaf level, has been changed.

FIG. 1 is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention. The efficient update module 120 operates in the client computer system 102 or the server computer system 104 to perform the preferred embodiment of the present invention. For example, information may be communicated to either the server 104 or the client 102 via the user interface 117 that changes data 134. The efficient update module 120 may subsequently use this information to update aggregate data 135, by using hierarchy relationships represented by objects 126 that may include aggregate objects 127. Further, the hierarchy relationships associate aggregate data 135 with the changed data 134. An aggregate table 129 may be used to structure the information associated with the aggregate object 127. The user interface 117 may communicate with the preferred embodiment of the present invention, either via batch input 119 or user input 118. Further, the database 110 may include at least one view 133 and may be configured in the memory 558 of the client 102 or the server 104. Alternatively the database 110 may be configured in computer storage such as that of a disk 122. Element 558 is described with reference to FIG. 5.

According to the preferred embodiment of the present invention the efficient update module 120 operates to improve the techniques associated with refreshing aggregate data 135 when the data 134 has been changed incrementally by efficiently updating the multidimensional database 132. Such an update uses hierarchy dependency relationships that are present in the tables of the multidimensional database 132. The efficient update module 120 advantageously improves the maintenance of aggregate data 135 in a multidimensional database 132 by minimizing the amount of aggregate data 135 that needs to be refreshed when a change is made to some of the data 134. The efficient update module 120 advantageously uses information about the hierarchy dependency relationship of data 134 that is typically stored in objects 126 that represent data entities 130. Data entities 130 may represent associations among things such as objects 126; and about which data 134 and aggregate data 135 may be stored in a database 110, such as a multidimensional database 132.

FIG. 2 includes FIG. 2A, FIG. 2B, FIG. 2C, and FIG. 2D. FIG. 2A is a block diagram that illustrates the hierarchy dependency relationship including the hierarchy levels 204 associated with objects 126 that are manipulated by the preferred embodiment of the present invention. Objects 126 are illustrated in the present example by the following: Object_1 as shown in element 206, Object_2 as shown in element 208, Object_3 as shown in element 210, Object_4 as shown in element 212, Object_5 as shown in element 214, Object_6 as shown in element 216, Object_7 as shown in element 218, Object_8 as shown in element 220, Object_9 as shown in element 222, Object_10 as shown in element 224, Object_11 as shown in element 226, Object_12 as shown in element 228, Object_13 as shown in element 230, Object_14 as shown in element 232, and Object_15 as shown in element 234. There may be many levels 204 that represent a plurality of hierarchy dependency relationships. Typically, data transactions are represented at the leaf level 236.

Figure 2B:
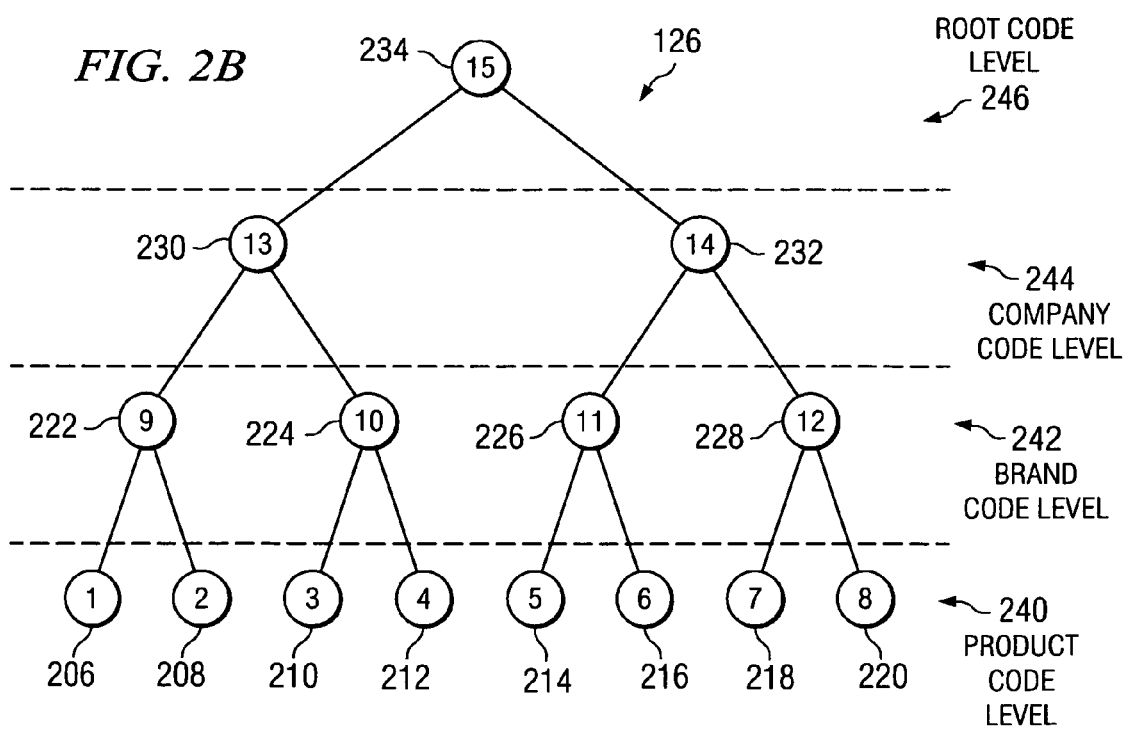
FIG. 2B is a block diagram that illustrates an example of the hierarchy dependency relationship.

FIG. 2B is a block diagram that illustrates an example of the hierarchy dependency relationship. In the present example, the data 134 at the leaf level 236 is represented by the Product Code Level 240 that includes the following objects 126: Object_1 as shown in element 206, Object_2 as shown in element 208, Object_3 as shown in element 210, Object_4 as shown in element 212, Object_5 as shown in element 214, Object_6 as shown in element 216, Object_7 as shown in element 218, and Object_8 as shown in element 220. The objects 126 included in the other levels 204 typically represent aggregate data 135. For example, the objects 126 at the Brand Code level 242, which is the first level above the Product Code Level 240, include: Object_9 as shown in element 222, Object_10 as shown in element 224, Object_11 as shown in element 226, and Object_12 as shown in element 228. The objects 126 at the Company Code Level 244 include: Object_13 as shown in element 230 and Object_14 as shown in element 232. Finally the object 126 at the Root Code Level 246 is Object_15 as shown in element 234. Elements 134 and 135 are described with reference to FIG. 1, and elements 204 and 236 are described with reference to FIG. 2A.

Figure 2C:
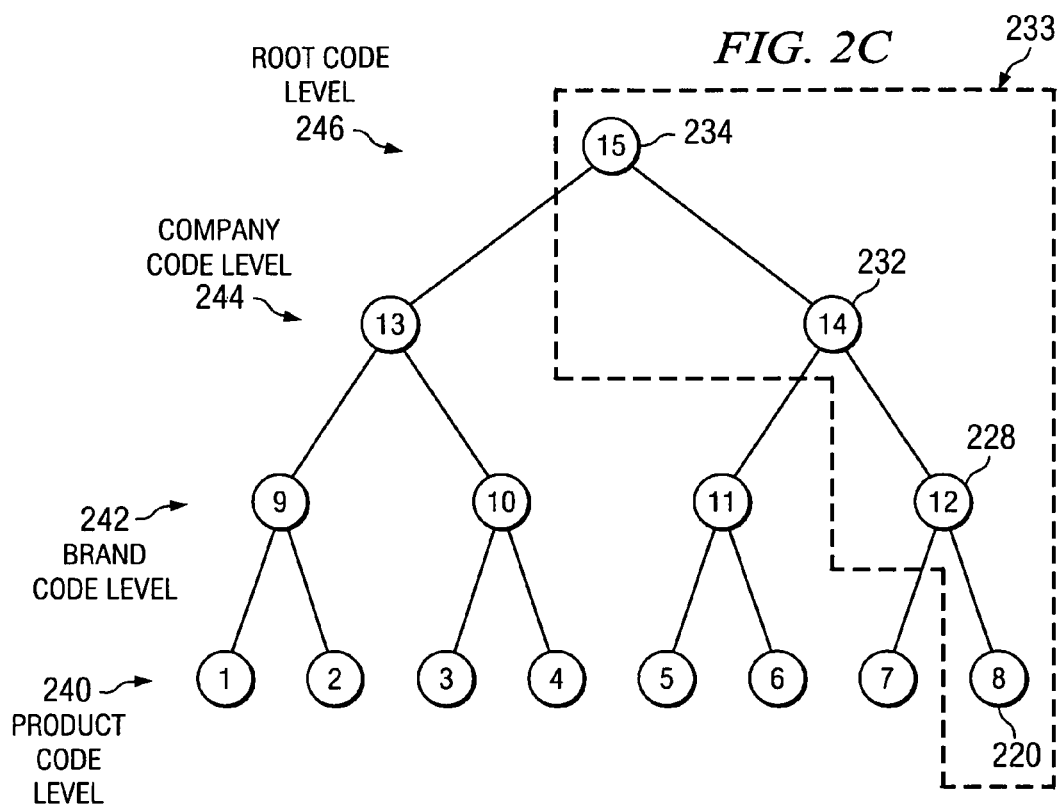
FIG. 2C is a block diagram that illustrates the affected data and associated objects of a hierarchy dependency relationship when lower-level data has been changed.

FIG. 2C is a block diagram that illustrates the affected aggregate data 135 in objects 126, when lower-level data 134 has been changed, by traversing the hierarchy dependency relationship, typically in an upward direction. The hierarchy dependency relationship typically represents a business model that is stable. Therefore, typically changes in the data 134 via transactions will directly affect the objects 126 at the leaf level 236. Therefore and by means of example, the Product Code Level 240 may be changed by transactions but the Brand Code Level 242, the Company Code Level 244, and the Root Code Level 246 represent objects 126 with aggregate data 135 and typically only change as a result of changes at the Product Code Level 240. More particularly and in the present example, if Object_8 as shown in element 220 is changed, then the aggregated information associated with Object_12 as shown in element 228, Object_14 as shown in element 232, and Object_15 as shown in element 234 will change. Further, a change to the data 134 associated with Object_8 as shown in element 220 will require a refresh and change to the aggregate data 135 associated with Object_12 as shown in element 228, Object_14 as shown in element 232, and Object_15 as shown in element 234. Therefore, the affected objects 126 are shown in element 233. Elements 126, 134, and 135 are described with reference to FIG. 1, and element 236 is described with reference to FIG. 2A.

Figure 2D:
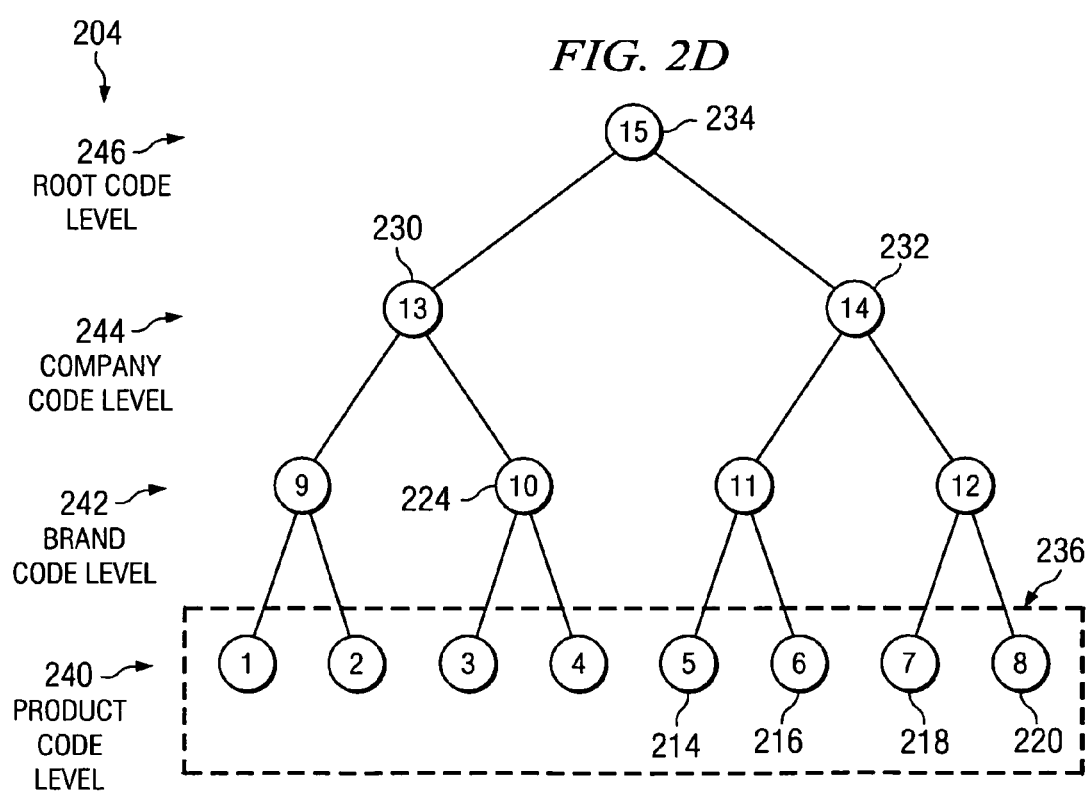
FIG. 2D is a block diagram that illustrates the affected data at the leaf level of a hierarchy dependency relationship when higher-level data needs to be updated.

FIG. 2D is a block diagram that illustrates the data 134 at the leaf level 236 of a hierarchy dependency relationship when higher-level aggregate data 135 needs to be updated, which is accomplished by traversing the hierarchy dependency relationship, typically in an downward direction. If Object_14 as shown in element 232 needs to be refreshed then the associated objects 126 at the leaf level 236, here represented by the Product Code Level 240, that may need to be assessed include: Object_5 as shown in element 214, Object_6 as shown in element 216, Object_7 as shown in element 218, and Object_8 as shown in element 220.

Occasionally, the hierarchy model (such as is shown in FIG. 2A) will be changed, typically due to business needs. This may require a change to data 134 at the levels 204 above the leaf level 236. For example, a business model and the associated hierarchy model may be changed when a product brand is sold to another company. In the present example the Company Code Level 244 represents Object_13 as shown in element 230 and Object_14 as shown in element 232. Therefore, if Object_10 as shown in element 224 that is represented at the Brand Code Level 242 is sold to a company represented by Object_14 as shown in element 232, then the following objects 126 would be refreshed: Object_13 as shown in element 230 and Object_14 as shown in element 232, and Object 15 as shown in element 234.

By means of further explanation, if Object_14 as shown in element 232 is deleted as a result of a change to the business model and the associated hierarchy model, then the object 126 at the Root Level 246, Object_15 as shown in element 234, would also be refreshed. Elements 126 and 134 are described with reference to FIG. 1, and element 204 is described with reference to FIG. 2A.

FIG. 3 includes FIG. 3A, FIG. 3B, FIG. 3C, FIG. 3D, and FIG. 3E. FIG. 3A is a block diagram that illustrates a star schema configuration 302 that is a named collection of objects 126 and that includes a fact object 304 and at least one dimension object 308. Fact objects 304 may include fact tables 303 that typically include reference data 307 and measurement data 305. Dimension objects 308 may include dimension tables 309 that typically include attribute data 311. Relational database 110 operations, such as "join," may be performed on tables, such as fact tables 303 and dimension tables 309. The dimension objects 308 intersect the fact object 304 via common columns. Typically, one dimension table 309 is associated with at least one reference column in the fact table 303. In the present example, the fact table 303 is joined to one or more dimension tables 309 according to specified relational or conditional operations. Elements 110 and 126 are described with reference to FIG. 1.

The fact tables 303 hold reference data 307 that is used to locate attributes in dimension tables 309. Additionally the fact tables 303 hold measurement data 305 that is typically numerical data 134. The dimension tables 309 hold attribute data 311 that may be either numerical or character format. In a star schema configuration 302 the attribute data 311, such as specific information about product markets or product identification descriptors, that is represented in a row in the dimension table 309 is used to join columns in a fact table 303. The preferred embodiment of the present invention may rely on a typical star schema configuration 302 that includes at least one fact object 304 that is associated with one or more dimension objects 308. The terms "star schema" and "star schema configuration" will be used interchangeably herein. Element 134 is described with reference to FIG. 1.

FIG. 3B is a block diagram that illustrates a star schema configuration 302 by use of an example of a Sales Fact Table 310, a Product Dimension Table 312, and a Time Dimension Table 314. A novel embodiment of the present invention takes advantage of the star schema configuration 302 to efficiently update multidimensional data cubes 132 by using hierarchy dependency relationships that are present in the tables of the multidimensional database 132. The Sales Fact Table 310 includes reference data 307 and measurement data 305. Attribute data 311 is included in both the Product Dimension Table 312 and the Time Dimension Table 314. In the present example, the tables of the multidimensional database 132 that are used for incremental update include: the Sales Fact Table 310, the Product Dimension Table 312, and the Time Dimension Table 314. It has been difficult in the past to change data 134 in a multidimensional database 132 without incurring the high cost associated with a refresh of the associated typically aggregate data 135. An embodiment of the present invention improves the techniques associated with refreshing aggregate data 135 in a multidimensional database 132 when the data 134 has been changed. Elements 132, 134, and 135 are described with reference to FIG. 1.

FIG. 3C is a block diagram that illustrates an example of the data 134 and aggregate data 135 included in a fact table 303, a dimension table 309, and an aggregate table 129. More particularly, FIG. 3C illustrates an example of the Product Dimension Table 312, the Sales Fact Table 310, and the Brand Code Aggregate Table 380 before a data transaction change occurs to the fact table 303 that would require a refresh of the aggregate data 135. Elements 129, 134, and 135 are described with reference to FIG. 1, and elements 303 and 309 are described with reference to FIG. 3A.

In the present example the Product Dimension Table 312 includes data 134 partitioned in columns and associated with a Product Code 350, a Brand Code 352, a Company Code 354, a Root Code 356, and a Status 358. In the present example the data 134 in the following columns is associated with information illustrated with reference to FIG. 2: Product Code 350, Brand Code 352, Company Code 354, and Root Code 356. The Product Code 350 identifies data 134 about individual products. The Brand Code 352 identifies aggregate data 135 about a set of products that comprise a brand. The Company Code 354 identifies aggregate data 135 about a set of brands controlled by a company. The Status 358 represents the status indicator value of the associated data 134. When the data 134 has not changed and therefore does not need to be refreshed, the status 358 is set to "zero." Therefore, the data 134 in rows with a status identifier 358 of "zero," such as row 8 as shown in element 369, has not changed within a refresh cycle. Element 134 is described with reference to FIG. 1.

In the present example the Sales Fact Table 310 includes data 134 partitioned into columns and associated with a Product Code 350, a Date 360, a Sales Item 362, and a Cost Item 364. Further, the data 134 associated with the Product Code 350 in the Sales Fact Table 310 is associated with the data 134 in the rows of the Product Code 350 in the Product Dimension Table 312. Therefore and by means of example, the information in the Sales Fact Table 310 and in eighth row as shown in element 367, is associated with the information in the Product Dimension Table 312 and in Row 5, as shown in element 366.

By means of further example, a Brand Code Aggregate Table, as shown in element 380, is used to aggregate, at the Brand Code Level 242 (as shown in FIG. 2), measurement data 305 (as shown in FIG. 3A) associated with the Product Code 350. Therefore, in the present example, the Brand Code Aggregate Table 380, includes the following columns: Brand Code 352; a sum of the sales value, "Sum-Sales," as shown in element 381, a sum of the cost value, "Sum-Cost," as shown in element 383, and a value of the covariance of sales and cost, "Covariance (Sales, Cost)," as shown in element 385. While SQL Code is used herein by means of example it should not be viewed as limiting. Many other computer-accessible forms of program code may be used to implement embodiments of the present invention. As shown in Equation One, SQL code may be used to generate the aggregate data 135 at the Brand Code Level 242 for the Brand Code Aggregate Table 380 as follows:

```
SELECT brand_code, sum(sales), sum(cost), covariance(sales,cost)    (1)
FROM sales, product
WHERE product.product_code = sales.product_code
GROUP BY brand_code
```

FIG. 3D is a block diagram that illustrates an example of the formation of a delta fact table 303, an updated dimension table 309, and an updated fact table 303. More particularly FIG. 3D is an example that includes the Product Dimension Table 312, the Sales Fact Table 310, and a Delta Sales Fact Table 368. The Product Dimension Table 312 includes the following columns: Product Code 350, Brand Code 352, Company Code 354, Root Code 356, and Status 358. Elements 303 and 309 are described with reference to FIG. 3A.

As indicated by the contents of the Delta Sales Fact Table 368, the information associated with the product having a value of "eight" for the Product Code 350 has changed in this refresh cycle. That is, the Delta Sales Fact Table 368 includes an entry, as shown in element 372, that is an extension of the Sales Fact Table 310 and that represents the newly-updated information associated with the Product Code 350 having a value of "eight" including: Date 360, Sales Item 362, and Cost Item 364.

In the preferred embodiment of the present invention, when the efficient update module 120 starts executing, the contents of the Delta Sales Fact Table 368 are appended to the Sales Fact Table 310, as shown in element 388. Then, the Status 358 associated with the dimension information included in the Product Dimension Table 312 of the eighth product code row, as shown in element 371, is now set to "one." It will be noted that the information in seventh product code row, as shown in element 370, has not changed. Therefore the associated Status 358 remains "zero." Element 120 is described with reference to FIG. 1.

FIG. 3E is a block diagram that illustrates an example of the refreshed aggregate data 135 after a data change and refresh. When a new transaction record has been added to the fact table 303, such as row eight, as shown in element 388, of the Sales Fact Table 310 (as shown in FIG. 3D), the aggregate data 135 at higher levels 204, such as the Brand Code Level 242 need to be refreshed. One way to accomplish such a refresh is to delete all the aggregate data 135 at the Brand Code Level 242 and then execute the SQL statement described in Equation One against the updated Sales Fact Table 310. The result of such a full refresh technique is illustrated, by means of example, in the Recomputed Brand Code Aggregate Table, as shown in element 384. The full refresh technique of the past is costly, as typically a small percentage of aggregate data 135 is affected during most data warehouse incremental refresh activities. In the present example, only row twelve, as shown in element 386, has changed from the values shown in element 382 of the Brand Code Aggregate Table 380. Element 135 is described with reference to FIG. 1, elements 204 and 242 are described with reference to FIG. 2, element 303 is described with reference to FIG. 3A, and elements 380 and 382 are described with reference to FIG. 3C.

Figure 4:
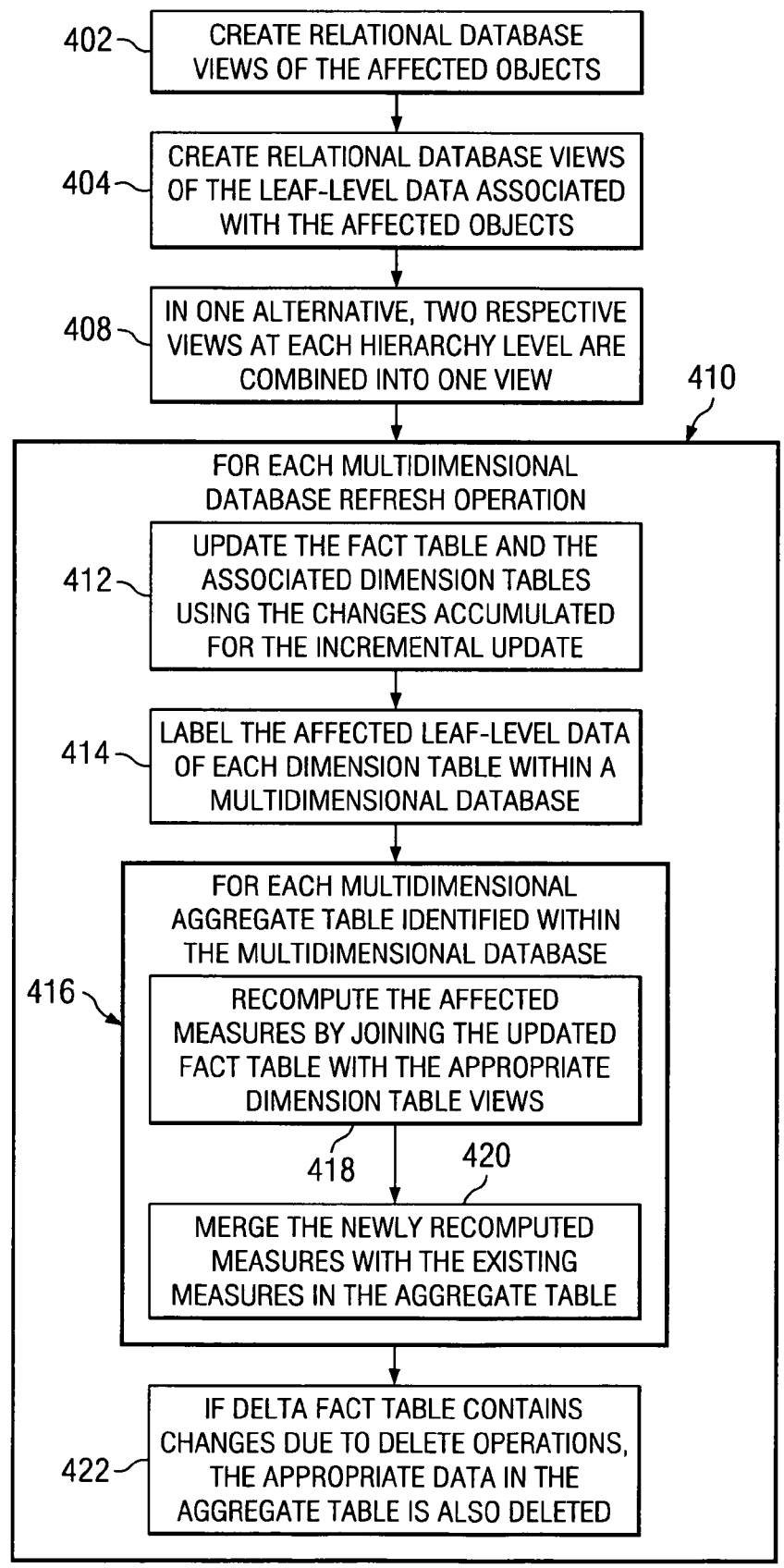
FIG. 4 is a flow diagram that illustrates an embodiment of the present invention.

FIG. 4 is a flow diagram that illustrates an embodiment of the present invention. As shown in element 402 relational database views 133 are created for the data 134 and associated objects 126 that are affected by the incremental change of multidimensional database data 134. Therefore, by means of example and as described with respect to FIG. 3D, if the Status 358 equals "one" at Row 8, then the view 133 of the Brand Code 352 is "twelve," the view 133 of the Company Code 354 is "fourteen," and the view 133 of the Root Code 356 is "fifteen." Further, if the distinct objects 126 with Status 358 equal to "one" are Object_7 as shown in element 218 and Object_8 as shown in element 220, then the view 133 of the Brand Code 352 is "twelve," the view 133 of the Company Code 354 is "fourteen," and the view 133 of the Root Code 356 is "fifteen." Elements 126, 132, 133, and 134 are described with reference to FIG. 1, and elements 204, 218, 220, and 236 are described with reference to FIG. 2.

Therefore by means of explanation and as shown in Equation Two, the following SQL code may be used to create the views 133 of the affected objects 126:

```
CREATE view product_product_key as              (2)
(SELECT distinct product_code
FROM Product
WHERE status = 1)
CREATE view product_brand_key as
(SELECT distinct brand_code
FROM Product
WHERE status = 1)
CREATE view product_company_key as
(SELECT distinct company_code
FROM Product
WHERE status = 1)
CREATE view product_root_key as
(SELECT distinct root_code
FROM Product
WHERE status = 1)
```

Then as shown in element 404, relational database views 133 of the leaf-level data 134 of the affected objects 126 are created. Therefore by means of example, and as shown in Equation Three, the following SQL code will create leaf-level data 134 associated with the refreshing operations of the affected objects 126:

```
CREATE view product_product_leaf as              (3)
(SELECT *
FROM Product a, Product_product_key b
WHERE a.product_code = b.product_code)
CREATE view product_brand_leaf as
(SELECT *
FROM Product a, Product_brand_key b
WHERE a.brand_code = b.brand_code)
CREATE view product_company_leaf as
(SELECT *
FROM Product a, Product_company_key b
WHERE a.company_code = b.company_code)
CREATE view product_root_leaf as
(SELECT *
FROM Product a, Product_root_key b
WHERE a.root_code = b.root_code)
```

Therefore and by means of further example of element 404 and as described with reference to FIG. 3D, the affected object 126 of Product Code 350 and Row 8, as shown in element 371 is "twelve." Therefore the relational database view 133 of the leaf-level data 134 associated with the affected Brand Code 352 will include Row 7, as shown in element 370, and Row 8, as shown in element 371. Further, the affected object 126 for the Company Code 354 is "fourteen" and the relational database view 133 of the leaf level data 134 associated with this affected object 126 will include the following rows of the Product Dimension Table 312: Row 5, Row 6, Row 7, and Row 8. Finally, the view 133 of the leaf level data 134 associated with the Root Code 356 will include all rows of the Product Dimension Table 312. Elements 312, 350, 352, 356, and 371 are described with reference to FIG. 3.

In one alternative embodiment of the present invention, the respective views 133 at each hierarchy level 204 are combined into one view 133, as shown in element 408. More particularly, element 408 illustrates an alternative embodiment, in which the coding syntax for elements 402 and 404 have been streamlined into one coding syntax. Therefore by means of example and as shown in Equation Four, the following SQL code may be used to create the combined views 133:

```
CREATE view product_product_view as              (4)
(SELECT *
FROM Product a
WHERE a.product_code in
(SELECT distinct b.product_code
FROM Product b
WHERE b.status = 1))
CREATE view product_brand_view as
(SELECT *
FROM Product a
WHERE a.brand_code in
(SELECT distinct b.brand_code
FROM Product b
WHERE b.status = 1))
CREATE view product_company_view as
(SELECT *
FROM Product a
WHERE a.company_code in
(SELECT distinct b.company_code
FROM Product b
WHERE b.status = 1))
CREATE view product_root_view as
(SELECT *
FROM Product a
WHERE a.root_code in
(SELECT distinct b.root_code
FROM Product b
WHERE b.status = 1))
```

Then, as shown in element 410 and for each incremental refresh operation of the multidimensional database 132 the following techniques are repeated. As shown in element 412, both the fact table 303 and the associated dimension tables 309 are updated using the changes accumulated from the incremental update, as illustrated in FIG. 3D. Then as shown in element 414, the affected leaf-level data 134 of each dimension table 309 is labeled by setting the Status 358 associated with the accumulated changes for this particular refresh cycle to "one." Elements 303, 309, and 358 are described with reference to FIG. 3. In the following examples "delta_sales" represents the changes to the fact table 303. By means of example and as shown in Equation Five, the following SQL code will set the affected leaf-level data 134 in the Product Dimension Table 312 properly:

```
UPDATE product                                    (5)
SET status = 0
UPDATE product
SET status = 1
WHERE product_code in
```
-continued
```
(SELECT distinct product_code
FROM delta_sales)
```

If one or more aggregate tables 129 (as shown in FIG. 1) are associated with the changed data 134, these aggregate tables 129 must be refreshed. Therefore, as shown in element 416, refresh operations for each aggregate table 129, such as the Brand Code Aggregate Table 380, are executed. More particularly as shown in element 418, the affected measures are recomputed by joining the data 134 in the updated fact table 303 with the associated data 134 in the appropriate dimension table views 133. This approach is more efficient than techniques of the past, since the updated fact table 303 is joined with a subset of the data 134 in the original dimension tables 309. Element 380 is described with reference to FIG. 3C. The SQL code as shown in Equation Six may be used for the operations of element 418. In Equation Six and Equation Seven, sales+delta_sales represents an update Sales Fact Table 310 (as shown in FIG. 3B).

```
SELECT p.company_code, STDEV(sales), count(*)    (6)
FROM sales+delta_sales a, product_company_leaf p
WHERE p.product_code = a.product_code
GROUP BY p.company_code
```

To efficiently refresh the Recomputed Brand Code Aggregate Table 384 (as shown in FIG. 3E) the following SQL code, as shown in Equation Seven, may be used:

```
SELECT brand_code, sum(sales), sum(cost), covariance(sales,cost)  (7)
FROM sales+delta_sales a, product_brand_leaf p
WHERE p.product_code = a.product_code
GROUP BY brand_code
```

Then as shown in element 420 the newly recomputed data 134 is merged with the existing data 134 in the aggregate tables 129. Also, as shown in element 422 if the delta fact table 303, such as the Delta Sales Fact Table 368, contains changes due to delete operations, the appropriate data 134 in the aggregate tables 129 also needs to be deleted. Therefore, by means of explanation and related to the example described with reference to FIG. 2B, if Object_7, a shown in element 218, and Object_8, as shown in element 220, are deleted from the fact table 303, then Object_12, as shown in element 228, should also be deleted from the associated aggregate table 129. Further, if Object_5 as shown in element 214, Object_6 as shown in element 216, Object_7 as shown in element 218, and Object_8 as shown in element 220, are all deleted from the fact table 303, then the following objects 126 found in the aggregate table 129 should be deleted as well: Object_11 as shown in element 226, Object_12 as shown in element 228, and Object_14 as shown in element 232.

Figure 5:
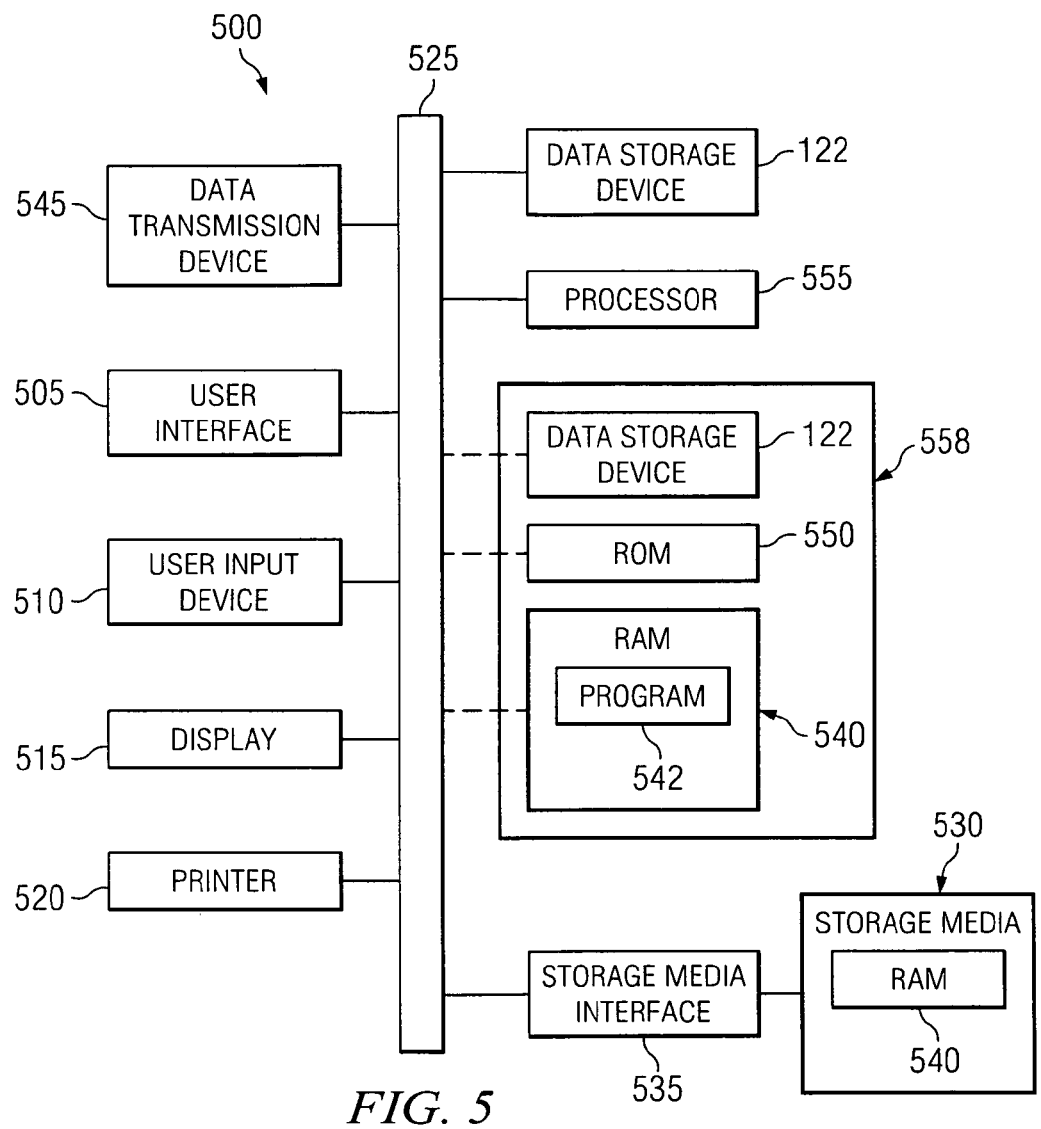
FIG. 5 is a block diagram of a computer system suitably configured for employment of the present invention.

FIG. 5 is a block diagram of a computer system 500, suitable for employment of the present invention. System 500 may be implemented on a general-purpose microcomputer, such as one of the members of the IBM Personal Computer family, or other conventional workstation or graphics computer devices. In its preferred embodiment, system 500 includes a user interface 505, a user input device 510, a display 515, a printer 520, a processor 555, a read only memory (ROM) 550, a data storage device 122, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system. The computer system 500 may be connected locally or remotely to fixed or removable data storage devices 122 and data transmission devices 545. For example, the server computer system 104 and the client computer system 102 also could be connected to other computer systems 500 via the data transmission devices 545. Elements 102 and 104 are described with reference to FIG. 1.

The RAM 540, the data storage device 122 and the ROM 550, are memory components 558 that store data and instructions for controlling the operation of the processor 555, which may be configured as a single processor or as a plurality of processors. The processor 555 executes a program 542 to perform the methods of the present invention, as described herein.

While the program 542 is indicated as loaded into the RAM 540, it may be configured on a storage media 530 for subsequent loading into the data storage device 122, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer usable device or medium, such as the memory 558, the data storage device 122, or the data transmission devices 545, thereby making an article of manufacture, such as a computer program product, according to the invention. As such, the terms "computer program product" as used herein are intended to encompass a computer program accessible from any computer usable device or medium.

Moreover, the computer programs 542 and operating systems are comprised of instructions which, when read and executed by the server computer system 104 and the client computer system 102, cause the server computer system 104 and the client computer system 102 to perform the steps necessary to implement and use the present invention. Under control of the operating system, the computer programs 542 may be loaded from the memory 558, the data storage device 122, or the data transmission devices 545 into the memories 558 of the server computer system 104 and the client computer system 102 for use during actual operations.

User interface 505 is an input device, such as a keyboard or speech recognition subsystem, for enabling a user to communicate information and command selections to the processor 555. The user can observe information generated by the system 500 via the display 515 or the printer 520. The user input device 510 is a device such as a mouse, track-ball, or joy stick that allows the user to manipulate a cursor on the display 515 for communicating additional information and command selections to the processor 555. Those skilled in the art will recognize many modifications may be made to this configuration without departing from the scope of the present invention.

When operating in accordance with one embodiment of the present invention, the system efficiently updates multidimensional data cubes 132 by using hierarchy dependency relationships that are present in the tables of the multidimensional database 132. The processor 555 and the program 542 collectively operate as a module for fast and efficient updating of a large amount of data 134 and aggregate data 135 when data 134 in a multidimensional database 132 has changed incrementally. It will be appreciated that the present invention offers many advantages over prior art techniques. Elements 132, 134, and 135 are described with reference to FIG. 1.

The present invention is typically implemented using one or more computer programs, each of which executes under the control of an operating system and causes the server computer system 104 and the client computer system 102 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM and DB2 are trademarks of International Business Machines Corporation in the United States, other countries, or both.

I claim:

1. A computer system for efficiently updating changed and associated data in a multidimensional database, said computer having a star schema configuration associated with said multidimensional database, said star schema having a hierarchy dependency relationship with at least one leaf level and at least one higher level; said star schema configuration including at least one fact table and at least one dimension table, said method comprising:

identifying changes in said data that are made in said at least one fact table;

forming at least one changed said fact table that includes said changed data and said data;

setting an indicator value for said changed data in at least one status column in said at least one dimension table;

identifying affected data at said leaf level that is identified by said at least one indicator value;

identifying said hierarchy dependency relationship in said at least one dimension table;

identifying affected data at said at least one higher level that is identified by said hierarchy dependency relationship and said affected data at said leaf level;

identifying subset data at said leaf level that is in said at least one dimension table, and that is associated with the said affected data at said at least one higher level; and updating at least one multidimensional database aggregate table that is updated with said subset data in said at least one dimension table and with said data in said at least one changed fact table thereby efficiently updating said changed and associated data in said multidimensional database wherein said updating said at least one multidimensional database aggregate table updates at least one non-additive measure.

2. The method of claim 1 wherein said updating said at least one multidimensional database aggregate table updates at least one additive measure.

3. A computer system for efficiently updating changed and associated data in a multidimensional database, said computer having a star schema configuration associated with said multidimensional database, said star schema having a hierarchy dependency relationship with at least one leaf level and at least one higher level; said star schema configuration including at least one fact table and at least one dimension table, comprising:
   said data that is changed and that is from said at least one fact table;
   at least one changed said fact table that includes said changed data and said data;
   an indicator value for said changed data in at least one status column in said at least one dimension table;
   affected data at said leaf level that is identified by said at least one indicator value;
   said hierarchy dependency relationship in said at least one dimension table;
   affected data at said at least one higher level that is identified by said hierarchy dependency relationship and said affected data at said leaf level;
   subset data at said leaf level that is in said at least one dimension table, and that is associated with the said affected data at said at least one higher level; and
   at least one multidimensional database aggregate table that is updated with said subset data in said at least one dimension table and with said data in said at least one changed fact table thereby efficiently updating said changed and associated data in said multidimensional database wherein said at least one multidimensional database aggregate table comprises at least one non-additive measure that is updated.

4. The computer system of claim 3 wherein said at least one multidimensional database aggregate table comprises at least one additive measure which is updated.

5. An article of manufacture comprising a computer program usable medium embodying one or more instructions executable by said computer for efficiently updating changed and associated data in a multidimensional database, said computer having a star schema configuration associated with said multidimensional database, said star schema having a hierarchy dependency relationship with at least one leaf level and at least one higher level; said star schema configuration including at least one fact table and at least one dimension table, wherein:
   said computer usable instructions identify changes in said data that are made in said at least one fact table;
   said computer usable instructions form at least one changed said fact table that includes said changed data and said data;
   said computer usable instructions set an indicator value for said changed data in at least one status column in said at least one dimension table;
   said computer usable instructions identify affected data at said leaf level by using said at least one indicator value;
   said computer usable instructions identify said hierarchy dependency relationship in said at least one dimension table;
   said computer usable instructions identify affected data at said at least one higher level by using said hierarchy dependency relationship and said affected data at said leaf level;
   said computer usable instructions identify subset data at said leaf level that is in said at least one dimension table, and that is associated with the said affected data at said at least one higher level; and
   said computer usable instructions update at least one multidimensional database aggregate table with said subset data in said at least one dimension table and with said data in said at least one changed fact table thereby efficiently updating said changed and associated data in said multidimensional database wherein said computer usable instructions that update said at least on multidimensional database aggregate table update at least one non-additive measure.

6. The article of manufacture of claim 5 wherein said computer usable instructions that update said at least one multidimensional database aggregate table update at least one additive measure.

* * * * *